United States Patent Office 3,462,434
Patented Aug. 19, 1969

3,462,434
2-ISOPROPYL-3-(p-AMINO-PHENYL)-3H-4-QUINAZOLONE
Alex Heusner, Karl Zeile, and Peter Danneberg, Ingelheim am Rhein, Germany, assignors to Boehringer Ingelheim G.m.b.H., Ingelheim am Rhein, Germany, a corporation of Germany
No Drawing. Filed Apr. 29, 1966, Ser. No. 546,164
Claims priority, application Germany, May 5, 1965, B 81,761
Int. Cl. C07d 51/46; A61k 27/00
U.S. Cl. 260—256.4
2 Claims

ABSTRACT OF THE DISCLOSURE

The compounds are 2-isopropyl - 3 - (p-amino-phenyl)-3H-4-quinazolone and its non-toxic acid addition salts, useful as sedatives and anticonvulsives in warm-blooded animals.

---

This invention relates to a novel 2-alkyl-3-phenyl-3H-4-quinozolone derivative and acid solution salts thereof, as well as to methods of preparing these compounds.

More particularly, the present invention relates to 2-isopropyl-3-(p-amino-phenyl) - 3H - 4 - quinazolone of the formula

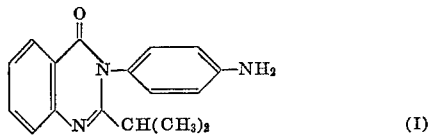

and non-toxic, pharmacologically acceptable acid addition salts thereof.

The compound of the Formula I above may be prepared by the following methods:

METHOD A

By reducing the corresponding p-nitro-phenyl quinazolone of the formula

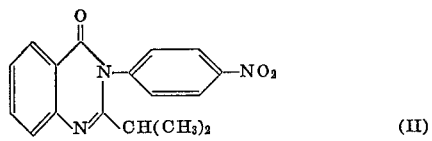

with catalytically activated hydrogen or nascent hydrogen.

METHOD B

By reacting an anthranilic acid derivative of the formula

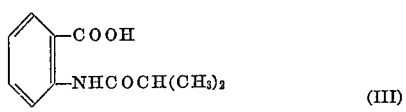

with p-phenylenediamine or an acid addition salt thereof, such as p-phenylenediamine monohydrochloride.

Since the compound of the Formula I is an organic base, it forms acid addition salts and particularly non-toxic, pharmacologically acceptable acid addition salts with inorganic or organic acids. Examples of non-toxic, pharmacologically acceptable acid addition salts include, but are not limited to, those formed with hydrochloric acid, hydrobromic acid, phosphoric acid, sulfuric acid, acetic acid, lactic acid, tartaric acid, methane-sulfonic acid, benzoic acid, citric acid, ascorbic acid, propionic acid, salicylic acid, 8-chlorotheophylline or the like. The acid addition salts may conveniently be obtained by dissolving the free base in a suitable solvent, and acidifying the solution with the desired inorganic or organic acid.

The following example further illustrates the invention and will enable others skilled in the art to understand it more completely.

Example 1.—Preparation of 2-isopropyl-3-(p-amino-phenyl)-3H-4-quinazolone by method A 6.18 gm. (0.02 mol) of 2-isopropyl-3-(p-nitro-phenyl)-3H-4-quinozolone were dissolved in 100 cc. of dioxane. Raney nickel was added to the solution, and the mixture was hydrogenated at room temperature and atmospheric pressure until absorption of hydrogen was complete. Thereafter, the reaction mixture was filtered to remove the catalyst, and the filtrate was evaporated in vacuo. A crystalline residue was obtained, which was recrystallized from a mixture of dioxane and water, yielding the reaction products in the form of colorless leaflets having a melting point of 219–221° C. It was identified to be 2-isopropyl-3-(p-amino-phenyl)-3H-4-quinazolone. The yield was virtually quantitative.

Example 2

2-isopropyl-3-(p-amino-phenyl)-3H-4-quinazolone dihydrochloride, M.P. 262–264° C., was prepared from 2-isopropyl-3-(p-amino-phenyl)-3H-4-quinazolone dissolved in ethanol by addition of ethereal hydrochloric acid.

The 2-isopropyl - 3 - (p-nitrophenyl)-3H-4-quinazolone (M.P. 139–145° C., recrystallized from a mixture of dimethylformamide and water) used as starting material above, may be obtained in customary fashion from N-isobutyryl-anthranilic acid and p-nitroaniline in the presence of a dehydrating agent, such as phosphorus oxychloride or phosphorus trichloride. The N-isobutyryl-anthranilic acid (M.P. 133–134° C., recrystallized from a mixture of glacial acetic acid and water) in turn may be obtained from anthranilic acid and isobutyric acid chloride or isobutyric acid anhydride, or by oxidation of N-isobutyryl-o-toluidine with potassium permanganate.

The compounds according to the present invention, that is, 2-isopropyl-3-(p-amino-phenyl)-3H-4-quinazolone and its non-toxic, pharmacologically acceptable acid addition salts, have useful pharmacodynamic properties. More particularly, they exhibit very effective sedative and anticonvulsive activities in warm-blooded animals without concurrent stimulation of the central nervous system and/or ataxia. This favorable combination of pharmacological activities is completely unexpected from the prior art teachings, in that it was heretofore believed that the replacement of the 2-methyl group in 2-methyl-3-aryl-3H-4-quinazolones by a higher homologous alkyl group brings about a significant reduction in the sedative activity (Andrisano and Chiesi, C.A. 58, 3428).

For pharmaceutical purposes the compounds according to the present invention are administered perorally or parenterally, preferably perorally, to warm-blooded animals as active ingredients in dosage unit compositions, that is, compositions in dosage unit form consisting essentially of an inert pharmaceutical carrier and one dosage unit of the active ingredient, such as tablets, coated pills, solutions, suspensions, syrups, capsules, wafers, suppositories and the like. One dosage unit of the compounds according to the invention is from 20 to 400 mgm., preferably 50 to 200 mgm.

The following example illustrates a dosage unit composition comprising a compound of the present invention as an active ingredient. The parts are parts by weight.

Example 3.—Tablets

The tablet composition is compounded from the following ingredients:

| | Parts |
|---|---|
| 2-isopropyl-3-(p-amino-phenyl)-3H-4-quinazolone | 100.0 |
| Lactose, pulverized | 130.0 |
| Corn starch | 156.0 |
| Colloidal silicic acid | 8.0 |
| Soluble starch | 4.0 |
| Magnesium stearate | 2.0 |
| Total | 400.0 |

Compounding procedure: The individual ingredients are admixed with each other in customary fashion to form a composition suitable for feeding into a tablet-making machine. The composition is then pressed into 400 mgm.-tablets, each of which contains 100 mgm. of the active ingredient.

It should be understood that any non-toxic, pharmacologically acceptable acid addition salt of the quinazolone compound in Example 2 may be substituted for the free base, and that the amount of the active ingredient may be varied within the dosage unit limits set forth above. Moreover, the nature and amounts of the inert ingredients may be varied to meet particular requirements.

While the present invention has been illustrated with the aid of certain specific embodiments thereof, it will be readily apparent to others skilled in the art that the invention is not limited to the illustrative embodiments and that various changes and modifications may be made.

We claim:
1. The compound of the formula

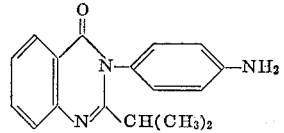

or a non-toxic, pharmacologically acceptable acid addition salt thereof.

2. 2-isopropyl-3-(p-amino-phenyl)-3H-4-quinazolone.

References Cited

FOREIGN PATENTS 936,902   9/1963   Great Britain.

OTHER REFERENCES

Bogart et al.: J. Am. Chem. Soc., vol. 33 (1911), pp. 949–62.

ALEX MAZEL, Primary Examiner

R. J. GALLAGHER, Assistant Examiner

U.S. Cl. X.R.

260—251, 253, 256.5, 518; 424—251